Patented Aug. 29, 1933

1,924,281

UNITED STATES PATENT OFFICE 1,924,281

LIQUID SEAL FOR GAS HOLDERS

Konrad Jagschitz, Mainz, Germany, assignor to Maschinenfabrik Augsburg - Nurnberg A. G., Nuremberg, Germany, a corporation of Germany No Drawing. Application April 12, 1930, Serial No. 443,694, and in Germany April 17, 1929

6 Claims. (Cl. 196—149)

The properties of the sealing liquid of waterless gas-holders for which hitherto tar products have mostly been used must fulfill a series of requirements the majority of which cannot be directly met by the products of the tar industry usually found in commerce, although tar, tar oils and the like are more suitable than other liquids. A reliable sealing liquid for waterless gas-holders must satisfy essentially three conditions:—

1. It must comply with the external requirements of the operation of the gas-holder, 2. Detrimental effects of the sealing liquid upon the gases which are stored in the gas-holder must not occur, 3. The constituents of the gases in the container must not damage the sealing liquid.

First of all the operation of the holder requires that the sealing liquid shall have a specific gravity which lies as high as possible above that of water and its viscosity must be such that it will ensure a reliable seal at summer as well as at winter temperatures. Further, it is required that the sealing liquid shall not contain any substances which will separate in a solid form at low temperatures lasting for some long period of time. These substances are carbon, dust, asphalts, naphthalene and anthracene. The viscosity of the sealing medium must be such that on the one hand it is not too fluid, as otherwise its passage through the sealing gap of the disc would be too quick and that, on the other hand, it shall not be too thick, as otherwise there is a danger of stoppage at low temperatures. Finally, the important requirement has to be fulfilled that any water which may reach into the sealing medium shall be capable of being easily and relatively quickly separated again and that when this water occurs more especially in the form of ice in the case of intense cold, it shall not disturb the operation of the gas-holder.

The second-mentioned requirement is especially important when pure gases, for instance hydrogen, nitrogen, carbonic acid, etc. have to be stored. These gases are nowadays required to a large extent for the synthesis of certain chemical compounds and they come in contact with contact materials which would become poisoned if they were contaminated with the constituents of the sealing liquid. Especially dangerous are the volatile sulphur-containing substances which penetrate into the gas, especially easily in the summer.

The constituents carried by the gases which act upon the sealing liquid are more especially sulphuretted hydrogen, finely divided tar, dust, naphthalene, and to an especially great extent water vapour, most of them having the effect on the sealing means that they gradually thicken it. Although it is not practically possible to prevent these substances from reaching the sealing liquid, it is possible by suitably choosing the latter to prevent detrimental effects for indefinite periods.

Not all liquid sealing means which are derived from petroleum or brown coal tar oil satisfy the requirements herein mentioned. For this reason they are not useful in practice. Their main disadvantage consists in the fact that their specific gravity is less than 1 or is very near 1, whilst for a reliable sealing means a specific gravity of at least 1.1 is required. As regards the first-mentioned liquids, a separation of the water is very difficult and any formation of ice leads to special difficulties because it collects at the bottom of the sealing devices filled with the liquids and cannot be removed, so that disturbances of the worst kind are unavoidable. Also the so-called "low-temperature distillation tars", which are close to the aliphatic series are unsuitable for the reason stated. Therefore, in practice, only such a sealing means comes into question which is obtained from coal-tar and which is constituted by suitably chosen fractions of this raw material. Coal-tar itself is not suitable since it is too contaminated by pitch, free carbon dust and the like and since it contains light oils and other volatile substances which cause difficulties by their volatilization. Further, it is not suitable at low winter temperatures.

According to the invention such a coal tar oil is used which has a specific gravity of about 1.1 and which, being free from distillation residue containing pitch or dust, consists exclusively of fractions of the coal-tar which boil over 250° C., which fractions are freed from naphthalene and anthracene and do not contain any phenols. By the various fractions being mixed in suitable proportions, a viscosity between 1.8 and 3.5 Engler degrees is moreover maintained at 50° C.

The sealing oil just mentioned does not cause any difficulties in its production, the processes required for its obtention being known per se. The fractions which come into question dissolve so well in one another that a uniform substance is obtained, and absence of crude anthracene enables the liquid to withstand temperatures of −30° C. for a long time without affecting the operation, since even at such low temperature no solid separations take place. Careful experiments have shown that a sealing means of the kind referred to satisfies the normal requirements for a good sealing means for about five years without it being necessary to add a diluting substance during this time.

It is to be pointed out that it has previously been attempted to use coal-tar oils alone or in admixture with other substances, for instance coal-tar and the like. Especially great hopes were entertained as regards the use of used-up benzene washing oil, by means of which sealing oils which have become especially viscous were again rendered capable of being used. However, since this used-up benzene washing oil contains about 65% of parts boiling between 200 and 300° C., and for this reason in the case of warm weather it gives up constituents to a large extent to the stored-up gas, the same is in principle not useful in the light of the experiences above mentioned. Moreover, used-up benzene washing oil has a specific weight of 1.05 at the utmost and for this reason is entirely useless for being employed for a long period of time as a sealing liquid.

In the case of other sealing liquids of coal-tar oils previously proposed, sufficient importance was not attributed to their being completely free from pitch, dust, etc.; that is to say in contradistinction to the sealing means according to the invention, the distillation residues containing these constituents were not completely removed. Further, no importance was attributed to the absence of anthracene, since the said sealing liquids contained anthracene oils which allowed the said substance to be deposited in solid form at low temperatures, thereby also causing disturbances. The improved sealing liquid differs very substantially from the former proposals and attempts as regards its properties and composition.

The danger of the retention of water in the sealing means is especially great when the same contains lower phenols and for this reason it was stated above that the improved sealing liquid shall be free therefrom. It is known that the removal of the phenols is important for the obtention of a sealing means. The liquids of this kind hitherto known have, however, the disadvantage that their viscosity is too great, which viscosity results automatically from the nature of their production, so that their constancy with respect to cold is often questioned and further that they contain constituents boiling at a lower point, which prevents their use in most cases. In contradistinction thereto, the sealing means obtained from coal tar and satisfying the requirements above mentioned is useful if the lower phenols are removed and if at the same time the viscosity is maintained between 1.8 and 3.5 Engler degrees (at 50° C.). The maintenance of this limit is exceedingly important for the operation of the holder. A sealing means of great viscosity has too great an inner friction to allow a separation of water to take place sufficiently quickly. Therefore during the presence of the sealing liquid contaminated with water in the deposition chambers provided at the foot of the container, the water cannot be separated and it reaches, together with the sealing liquid, the circulating pumps which then produce an emulsion, so that the water can never be properly removed from circulation. On the other hand, too great a fluidity, which in most cases also reduces the specific gravity, reduces on the one hand the possibility of a separation between water and sealing means and it has, on the other hand, the disadvantage that in summer, owing to evaporation, too much liquid is lost. If in the latter case the circulating pumps have to work very often, then owing to the reduction of time which is available for the deposition of the water from the sealing liquid, the danger of the formation of an emulsion is increased, so that also in this case, even if for physical reasons a separation of water would be possible, such separation is detrimentally affected by the requirements of operation. The removal from the sealing liquid of lower phenols only is not sufficient since also the free carbon and, under certain circumstances, naphthalene and anthracene, could produce a disadvantageous retention of water or even ice.

If it is desired to store in the holder especially sensitive gases which have therefore to be maintained very pure, it is advisable further to reduce the tendency to volatilization. This is effected by removing all the fractions with a boiling point below 300° C. In this way the advantage is secured at the same time that the viscosity is somewhat increased, so that in the summer, when the heat is great, a further decrease in the passage of the sealing liquid is obtained, whilst on the other hand the viscosity is not yet so great that there is a danger of stoppage at winter temperatures. A similar effect to that produced by the removal of the fractions under 300° C. can also be obtained by increasing the content of constituents boiling at a higher point, by the admixture of fractions of anthracene oils having the highest boiling points and free from crude anthracene. Especially favourable has been found to be an enrichment of the constituents having a boiling point between 400 and 450° C. to about 30%, which is about double that of the normal tar oil chosen according to the features above indicated.

The production of the sealing means according to the invention does not cause any practical difficulties and can be ensured without chemically influencing the raw material simply by suitably carrying out the distillation of the tar and choosing the fractions which come into question. For this reason the new sealing means is cheap and can be obtained everywhere. Moreover, in addition to its being exceedingly suitable for use as a sealing means, it may be employed as a lubricating means in waterless gasholders in order to reduce the friction between the wall and the sealing bodies sliding thereon since such a lubricating means has to fulfill the same requirements as a sealing liquid and therefore it has to fulfill the same requirements which are satisfied, in a manner hitherto unknown, by the present invention.

If the conditions to which the sealing means are subjected are particularly exacting it is advantageous not only to take into account the above characteristics when selecting said sealing means, but also to take into consideration their origin or manufacture. In all difficult cases the oil produced by the following process is advantageous.

1. Distilling off of the crude tar and removal of the fractions distilled over 210° to 450° C. for further use.

2. Separation of the anthracene therefrom by supercooling and filtration for several days.

3. Further distillation of the oily filtrate and use of the fractions according to the principles as above mentioned.

It is to be mentioned in connection therewith that it is known per se to use the methods mentioned in the obtention of tar distillates. The invention lies in the utilization of the idea that distillates produced in this manner have special properties as regards the specific gravity, viscosity, stoppage point, freedom from certain admixtures, capability of emulsion with water, etc., which render them suitable as a sealing means in the respective industrial branches.

What I claim is:

1. In a gasholder, a sealing liquid for the seal or seals thereof, consisting of a mixture of coal-tar fractions boiling between over 250° C. and about 450° C. and substantially free from distillation residue containing pitch or dust and also from naphthalene, anthracene, and phenols, said mixture having a specific gravity of about 1.1 and a viscosity between 1.8 and 3.5 Engler degrees (at 50° C.), and capable of withstanding a temperature of about 30° C. without precipitation.

2. A sealing liquid for gasholders according to claim 1, said liquid composed of fractions which boil between 300° C. and about 450° C.

3. The method of producing a sealing liquid for waterless gasholders which comprises distilling coal tar and collecting the fractions distilling over at temperatures between about 210° and 450° C., supercooling such fractions for several days and filtering to remove the anthracene, and re-distilling the product and collecting the fractions distilling between 250° C. and 450° C.

4. A sealing liquid for gasholders with liquid seal, consisting of a mixture of coal-tar fractions boiling over 250° C. and substantially free from distillation residue containing pitch or dust and also from naphthalene, anthracene, and phenols, said mixture having a specific gravity of about 1.1 and a viscosity between 1.8 and 3.5 Engler degrees (at 50° C.), the content of the fractions boiling between 400 and 450° C. comprising approximately 30% of the mixture.

5. The method of producing a sealing liquid for waterless gasholders which comprises distilling coal tar and collecting the fractions distilling over at temperatures between about 210° and 450° C., supercooling such fractions for several days and filtering to remove the anthracene, redistilling the product and collecting the fractions distilling above 250° C., and adding to the distillate a quantity of a fraction boiling between about 400 and 450° such that the total content of such fraction in the mixture is about 30%.

6. The method of sealing a gasholder which comprises employing in the seal or seals thereof a mixture of coal-tar fractions boiling between 250° C. and about 450° C. and substantially free from distillation residue containing pitch or dust and also from naphthalene, anthracene and phenols, said mixture having a specific gravity of about 1.1 and a viscosity between 1.8 and 3.5 Engler degree (at 50° C.).

KONRAD JAGSCHITZ.